July 7, 1964     D. S. STRADER     3,140,001
EJECTOR MECHANISM FOR TRACTOR LOADERS
Filed Nov. 30, 1962
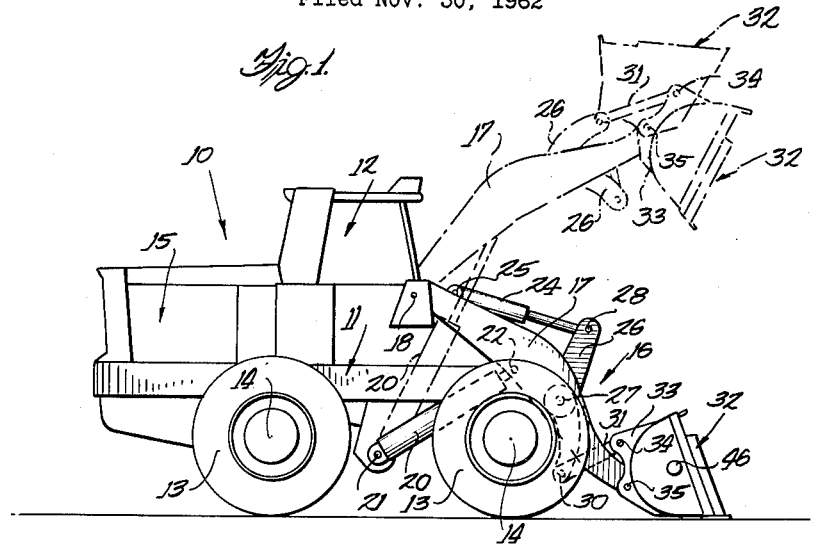
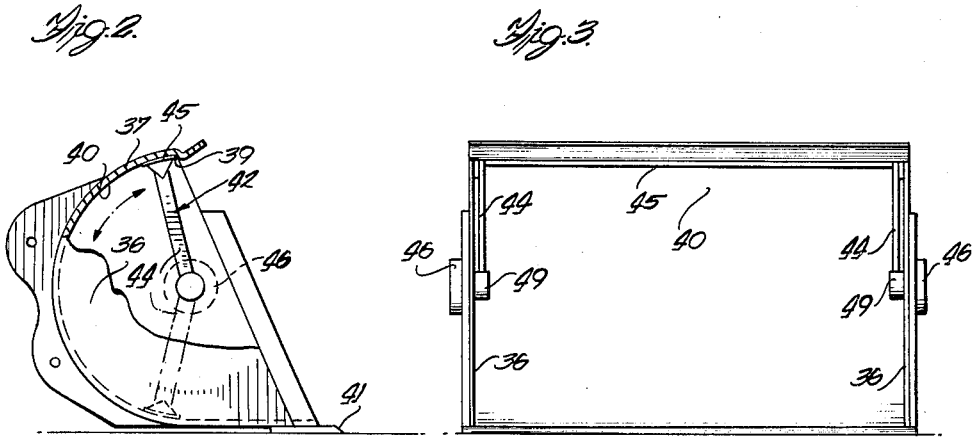
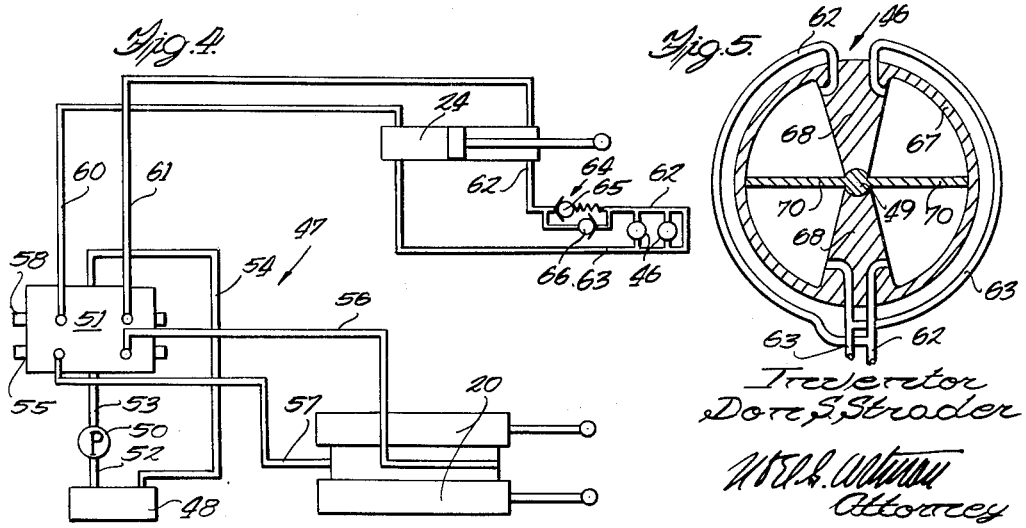
Inventor
Don S. Strader United States Patent Office 3,140,001
Patented July 7, 1964

1

3,140,001
EJECTOR MECHANISM FOR TRACTOR LOADERS
Don S. Strader, Mount Prospect, Ill., assignor to The
Frank G. Hough Co., a corporation of Illinois
Filed Nov. 30, 1962, Ser. No. 241,294
2 Claims. (Cl. 214—140)

This invention relates to power loaders and more particularly to means for positively ejecting material from the implement of such loaders such as a bucket when they are moved toward their discharge or dumping position.

It is an object of the present invention to provide an ejector mechanism of simple and inexpensive design which insures automatic ejection of the contents of a tractor loader bucket upon its movement towards the dumping position.

A further object of the present invention is to provide an ejector mechanism which can readily be incorporated in the hydraulic circuit of the loader mechanism without further operator controls being necessary.

Still another object of the present invention is to provide an ejector mechanism for a tractor loader bucket wherein operation of the loader mechanism to the dumping position automatically operates the ejector mechanism for removal of the contents of the bucket. Further, upon further operating the loader mechanism to the loading position, the ejector mechanism is automatically operated in the opposite direction preparatory to the next dumping position and automatic removal of contents by the ejector mechanism.

Other objects and features of the present invention will be apparent upon a perusal of the following specification and drawings of which:

FIG. 1 is a side elevational view of a tractor loader utilizing the subject invention;

FIG. 2 is a side elevational view of the bucket showing operative positions of the subject invention;

FIG. 3 is a front elevational view of FIG. 2;

FIG. 4 is a schematic view of the hydraulic circuit for operation of the subject invention; and FIG. 5 is a cross sectional view of the wiper arm actuator.

The present embodiment is the preferred embodiment, but it is to be understood that changes can be made in the present embodiment by one skilled in the art without departing from the spirt and scope of the present invention.

For a general description of the subject invention reference is now made to the drawings. A front end four-wheel tractor loader of conventional construction wherein duplicate boom arms, one being shown, are pivotally connected to the tractor loader at one end and elevated for raising and lowering by a hydraulic ram, one also being shown, pivotally connected at its ends intermediate the boom arm and the frame of the tractor loader. In addition to the boom arms the loader mechanism further includes a linkage means pivotally connected at one end to the tractor loader and at the other end forwardly of the intermediate connection of the hydraulic ram. The linkage means and boom arms include forward free ends for their separate pivotal connections to a bucket of conventional construction. To extend and retract the linkage means an extensible means or double-acting actu-

2 ator is included therein such that upon extension or retraction of the linkage means the pivotally connected bucket is pivoted about the forward free end of the boom arms.

Through a hydraulic circuit the hydraulic ram and extensible means can be selectively operated by the operator through a control valve accessible within the operator's compartment so that the boom arms can be selectively elevated and the extensible means can be selectively extended or retracted so that the bucket 32 could assume one of three illustrated operating positions: a loading position, a dumping position and raised position such as shown in FIG. 1.

The ejector mechanism of the subject inventin incorporated within the walls of the bucket and connected to the hydraulic circuit across the extensible means comprises a wiper arm, reversible actuator means and fluid responsive valve means. The wiper arm includes spaced-apart links connected at one end to a wiper member and at the other end to the reversible actuator means which are secured to the spaced-apart side walls of the bucket. The transverse length of the wiper arm is somewhat less than the dimensional spacing between the inner surfaces of the bucket side walls. The rear wall of the bucket interconnecting the spaced-apart side walls thereof includes an arcuate portion wherein the inner surface thereof is swept by the wiper arm. The radial length of the wiper arm to the reversible actuator means connection corresponds substantially to the radial length of the arcuate portion of the rear wall inner surface. As shown in FIG. 4, the fluid responsive valve means and reversible actuator means are parallel connected to opposite ends of the extensible means wherein pressure fluid flow within the hydraulic circuit for retraction of the extensible means results in pressure fluid flow acting upon the pressure regulated check valve means. Upon substantially complete retraction of the extensible means sufficient fluid pressure will act upon the pressure regulated check valve means for opening thereof and actuation of the reversible actuator means in one direction for sweeping movement of the wiper arm in a counterclockwise direction from the upwardmost position in the bucket shown in FIG. 2 to the lowermost position such as also shown in FIG. 2. However, if the hydraulic circuit is selectively operated for the extension of the extensible means, the other check valve within the valve means responsive only to directive flow simultaneously opens with the extension of the extensible means so that the reversible actuator means is operated in the opposite or clockwise direction to return the wiper arm to the upwardmost position shown in FIG. 2 against an indentation formed in the bucket rear wall for limiting the wiper arm movement.

Thus no further controls are necessary within the conventional hydraulic circuit for selectively operating the elevation of the boom arms through the hydraulic means through the extensible means in which the ejector mechanism within the bucket is connected across the extensible means for operation therewith. If the bucket is in the dumping position shown in FIG. 1 in dotted lines, and the linkage extensible means is substantially completely retracted, pressure fluid at the predetermined pressure opens the valve means resulting in movement of the wiper arm for removal of the contents within the bucket. Then if the bucket is returned to the loading position shown in solid lines in FIG. 1 in which the hydraulic circuit is selectively operated for extension of the extensible means, the valve means simultaneously opens for movement of the wiper arm in the opposite direction to return to the uppermost position of the bucket preparatory to the next wiper removal of the contents within the bucket.

For a detailed description of the subject invention, continued reference is made to the drawings. In FIG. 1 a front-end four-wheel tractor loader 10 of conventional construction comprises a frame 11 supported over front and rear wheels 13 on front and rear axles 14 and further comprises an operator's compartment 12 positioned substantially between front and rear axles 14. The engine compartment 15 is located rearwardly of the operator's compartment 12. A loader mechanism 16 of conventional construction comprises duplicate boom arms 17, one being shown, pivotally connected at one end through a pivotal connection 18 forwardly of the operator's compartment 12 and elevated for raising and lowering thereof through a hydraulic ram 20 pivotally connected at its ends through a pivotal connection 21 on the frame 11 and a pivotal connection 22 intermediate the ends of the boom arms 17. The loader mechanism 16 further includes a linkage means having a double-acting actuator or extensible means 24 pivotally connected at one end through a pivotal connection 25 on the tractor loader and at the other end pivotally connected to a pivotal connection 28 on a cross member 26. The cross member 26 between the ends thereof its pivotally connected through a pivotal connection 27 intermediate the ends of the boom arms 17 but forwardly of the pivotal connection 22 at one end of the hydraulic ram 20. The other end of the cross arm 26 includes a pivotal connection 30 to a forwardly extending link 31. A bucket 32 is pivotally connected to the forward free ends of the link 31 and the boom arms 17 through separate spaced-apart pivotal connections 34 and 35 on rearwardly extending flange portions 33 of the bucket 32.

Through a hydraulic circuit to be subsequently described the boom arms 17 can be elevated for raising and lowering by the hydraulic rams 20; similarly, the extensible means 24 can be extended or retracted for pivotal movement of the bucket 32 about the pivotal connection 35 on the forward end of the boom arms 17. As shown in solid lines in FIG. 1 in the ground-engaging position, the bucket 32 is in the load engaging position. As further shown in dotted lines with the boom arms 17 in an elevated position, the bucket 32 could be either in a dumping position or in a carrying position. Although only three operative positions of the bucket 32 and two operative elevated positions of the boom arms 17 have been illustrated, it should readily be understood by those skilled in the art that other operative positions than shown are obtainable for the boom arms 17 and the bucket 32.

Turning now to the subject invention, the ejector mechanism is incorporated within the bucket 32. Firstly, the bucket 32 comprises a pair of spaced-apart side walls 36 interconnected by a one-piece rear wall 37 which includes an arcuate portion having an inner arcuate surface 40. One end of the arcuate portion of the rear wall 37 provides an indentation or formed stop means 39 for limiting or stopping movement of and protecting the ejector mechanism 42 during the loading cycle of the bucket. The other end of the rear wall 37 includes a cutting edge 41. The ejector mechanism 42 comprises a pair of spaced-apart links 44 interconnected at one end to the wiper member 45 and at the other end to one end of a shaft 49 extending outwardly from the reversible actuator means 46 in a suitable manner such as welding. Then the reversible actuator means 46 is secured in a suitable manner to the bucket side walls 36 such as by welding. The wiper arm should be of a transverse length somewhat less than the dimensional spacing between the inner surfaces of the bucket side walls 36. Further, the wiper arm should be of a radial length from the actuator shaft portion 49 to the inner surface 40 of the rear wall 37 corresponding substantially to the radial length of the inner arcuate surface 40. Thus the radial length and transverse length of the wiper arm should be sufficient to provide freedom of movement in sweeping across the inner arcuate surface of the rear wall in either direction without any binding action but at the same time accomplishing effective removal of the contents within the bucket 32.

Turning now to the hydraulic circuit schematically shown in FIG. 4 which provides a reservoir 48, pump 50 and control valve 51 interconnected by a suction conduit 52, supply conduit 53, and return conduit 54. The control valve 51 provides a valve spool 55 for selectively directing pressure fluid to conduits 56 and 57 respectively connected at opposite ends of the rams 20. Another valve spool 58 within the control valve 51 selectively directs pressure fluid to the bucket cylinder 24 at opposite ends thereof through the conduits 60 and 61. It is to be understood that the control valve 51 is of the open-center type construction and that the valve spools 55 and 58 can be selectively operated by the operator within the operator's compartment 12 through any suitable known means, such as manually. As shown in FIG. 4, both reversible actuator means 46 of the ejector mechanism 42 are also connected across the extensible means 24 through the conduits 62 and 63. In other words, both actuator means 46 and the bucket cylinder 24 are connected in parallel to the conduits 60 and 61. The importance of this construction will be evident below.

Interposed between the extensible means 24 and the reversible actuator means 46 is a fluid responsive valve means 64 responsive to pressure fluid flow in each direction. If pressure fluid flow occurs in conduit 62 in one direction acting upon a pressure regulated check valve 65 at a predetermined pressure, the check valve 65 is opened thereby permitting movement of the reversible actuator means 46 and the wiper arm in one direction counterclockwise, as shown by the arrow in FIG. 2, for the removal of contents within the bucket 32. The pressure regulated check valve 65 is of conventional construction and comprises a spring and ball valve acting upon a seat such that the spring is of a predetermined value corresponding to the predetermined fluid pressure within conduit 62 for opening of the pressure regulated check valve 65. Now if the pressure fluid flow occurs in the opposite direction in conduit 62, a fluid check valve 66 within the valve means 64 is opened upon the pressure fluid acting in the other direction to thereby cause movement of the reversible actuator means 46 and the wiper arm in the opposite or clockwise direction as shown by the arrow in FIG. 2. The check valve 66 is of conventional construction and comprises a ball valve acting upon a valve seat wherein the check valve is opened only when the pressure fluid flow in conduit 62 flows in the other direction. Thus, depending upon the direction of pressure fluid flow in conduit 62, pressure regulated check valve 65 opens only at a predetermined pressure fluid flow in one direction—at high pressure—and check valve 66 opens only when pressure fluid flow occurs in the other direction and at relatively low pressures.

It may be noted that in normal operation the check valve 65 will open only after the cylinder 24 has reached the end of its retracting stroke and fluid pressure in conduits 61 and 62 reaches maximum dump pressure which is regulated within control valve 51. Thus an experienced operator can completely dump a load of loose material and retract the bucket mechanism without allowing the ejector to function. Conversely, when working in sticky material the ejector can be caused to function automatically simply by holding the control lever in the "dump" position momentarily after the cylinder is fully retracted. Under any conditions, the check valve 65 should not open until the bucket 32 has been moved to a dumping position. The return of the ejector 42 to the upper end of the bucket 32 occurs before the bucket ram 24 pivots the bucket 32 rearwardly from the dump position. This operation is due to the very minimum pressure required to open check valve 66 by fluid pressure in conduit 62, and the force required to return the ejector 42 relative to the force required to return the bucket 32. The bucket 32, by virtue of its much greater weight and the attitude of its mass relative to the weight and attitude of the ejector 42, requires a much greater hydraulic force than does tthe ejector 42 to be returned from the dump position. The rapid return of the ejector 42 to sharply strike the stop 39 while the bucket 32 is still in the dump position is a real advantage in that the attendant jarring of the bucket 32 in the dump position aids in a cleaning of the bucket 32.

Turning to FIG. 5, one suitable reversible actuator means 46 is a rotary type motor which comprises a circumferential housing 67 providing at one portion thereof inwardly disposed converging walls 68 journally supporting the shaft 49 connected to the outer extending portion thereof. The shaft 49 has vane members 70 extending radially outwardly therefrom to divide the inner chamber therein into four quadrants. The vane members 70 should be of sufficient length so as not to bindingly engage the inner arcuate surface of the housing 67. If pressure fluid appears in the conduit 62 in one direction two of the quadrant chambers are actuated for movement of the vane members 70 in a counterclockwise direction corresponding to the movement of the wiper arm as indicated by the arrow in FIG. 2. Now if pressure fluid appears in conduit 63 thereby causing pressure fluid flow in conduit 62 in the other direction the pressure fluid from conduit 63 appearing in the two remaining quadrants actuates the vane members in the clockwise direction causing corresponding movement of the wiper arm in the clockwise direction as indicated by the arrow in FIG. 2. It should now be understood that the aforedescribed internal construction of the reversible actuator means 46 is considered to be one suitable form for operation of the subject invention.

In view of the aforedescribed description of the subject invention, the operation thereof will now be set forth. Assuming that the loader mechanism 16 and the pivotally connected bucket 32 are in the ground-engaging position as shown in FIG. 1 in solid lines. The operator then selectively operates the control valve 51 to elevate the boom arms 17 to the raised position shown in dotted lines by selective movement of the valve spool 55. It is further assumed that the wiper arm of the ejector mechanism 42 is in the upwardmost position of the bucket 32 engaging the stop means 39 as shown in FIG. 2. Then if the operator selectively operates the valve spool 58 for retraction of the extensible means 24, active pressure fluid appears in conduits 61 and 62. However, the valve means 64 does not permit pressure fluid flow in conduits 62 and 63 until substantially complete retraction of the extensible means 24 wherein the bucket 32 is pivotally moved to the dumping position and the pressure fluid in conduit 62 has built up sufficient pressure corresponding to the predetermined pressure for opening of the pressure regulated check valve 65 within the valve means 64 and consequent movement of the reversible actuator means 46 and the wiper arm in the counterclockwise direction as shown in FIG. 2 for the removal of contents within the bucket 32 while in the dumping position. The downwardmost position of the wiper arm 42 as shown in dotted lines in FIG. 2 corresponds to the abutting engagement of the vane members 70 against the inwardly converging portions 68 of the reversible actuator means 46.

After dumping the contents of the bucket 32 through the operation of the ejector mechanism 42, the bucket 32 and boom arms 17 are eventually returned to the ground-engaging position through selective operation of the valve spools 55 and 58 within the control valve 51 by the operator. During the return to the ground-engaging position the extensible means 24 is partially extended through active pressure fluid flow in conduits 60 and 63 wherein the check valve 66 within the valve means 64 automatically opens thereby causing simultaneous movement of the reversible actuator means 46 and the extensible means 24 returning simultaneously the bucket 32 to the load engaging position and the wiper arm of the ejector mechanism 42 in clockwse movement to the upwardmost position of the bucket 32 against the stop means 39. It should be noted here that instead of the stop means 39 the inwardly converging portions 68 of the actuator means 46 along with the vane members 70 upon abutting engagement could have been used as a stop means. Whether the boom means 17 are in the raised or lowered position and even though the wiper arm 42 is abutting stop 39, further extension of the extensible means 24 for positioning the bucket 32 in the carrying position results in no damage to the ejector mechanism.

Having described the invention, what is considered to be new and desired to be protected by Letters Patent is:

1. In a tractor loader having a pair of boom arms, a bucket pivotally attached to said boom arms, a double-acting hydraulic cylinder operably connected to said bucket for pivoting said bucket between a carry position when fluid under pressure is admitted to one end of said cylinder and a dump position when fluid under pressure is admitted to the other end of said cylinder, the improvement comprising; an ejector blade rotatably mounted with said bucket, said blade having a weight substantially less than the weight of said bucket, a reversible actuator connected to said blade for rotating said blade between a stored position when fluid under pressure is admitted to one side of said actuator and an eject position when fluid under pressure is admitted to the other side of said actuator, first conduit means connected between said one end of said cylinder and said one side of said actuator, second conduit means connected between said other end of said cylinder and said other side of said actuator, valve means interposed in one of said conduits for permitting free fluid flow only from said one end of said cylinder to said one side of said actuator and for permitting fluid flow from said other end of said cylinder to said other side of said actuator only when the fluid pressure exceeds that valve normally required to operate said cylinder, whereby said ejector blade will initiate movement toward said eject position only after said bucket has been moved to said dump position and said ejector blade will be returned to stored position before said bucket initiates movement toward said carry position.

2. In a tractor loader having a pair of boom arms, a bucket pivotally attached to said boom arms, a double-acting hydraulic cylinder with a rod end and a head end connected to said bucket for pivoting said bucket between a carry position when fluid under pressure is admitted to said head end of said cylinder and a dump position when fluid under pressure is admitted to said rod end of said cylinder, the improvement comprising; an ejector blade rotatably mounted within said bucket, said blade having a weight substantially less than the weight of said bucket, a reversible actuator connected to said blade for rotating said blade between a stored position when fluid under pressure is admitted to one side of said actuator and an eject position when fluid under pressure is admitted to the other side of said actuator, first conduit means connected between said head end of said cylinder and said one side of said actuator, second conduit means connected between said rod end of said cylinder and said other side of said actuator, a first check valve interposed within said second conduit means for permitting fluid flow only from said cylinder to said actuator, a spring biasing said first check valve closed with sufficient force to hold said first check valve closed until the fluid pressure exceeds that valve normally required to operate said hydraulic cylinder, and a second check valve connected in parallel with said first check valve for permitting free fluid flow only from said actuator to said cylinder whereby said ejector blade will initiate movement toward said eject position only after said bucket has been moved to said dump position and said ejector blade will be returned to stored position before said bucket initiates movement toward said carry position.

References Cited in the file of this patent

UNITED STATES PATENTS

| | | |
|---|---|---|
| 2,683,542 | Baker | July 13, 1954 |
| 2,786,723 | Harsch | Mar. 26, 1957 |
| 2,858,035 | Mettetal | Oct. 28, 1958 |
| 2,885,103 | Cunningham | May 5, 1959 |
| 3,009,590 | Kampert | Nov. 21, 1961 |

FOREIGN PATENTS

| | | |
|---|---|---|
| 203,117 | Australia | Aug. 15, 1956 |